Patented Mar. 17, 1942

2,276,951

UNITED STATES PATENT OFFICE 2,276,951

CHLORINATED POLYISOBUTYLENE AND PROCESS OF MAKING THE SAME

Harold W. Fisher, Cranford, N. J., assignor to Standard Oil Development Company, a corporation of Delaware No Drawing. Application February 25, 1939, Serial No. 258,457

2 Claims. (Cl. 204—163)

This invention relates to high molecular weight polymerized olefins and to methods of improving the exposed surfaces of such polymers.

Solid, high molecular weight polymers of olefins, such as polymerized isobutylene, have been found to possess valuable rubber-like properties and to have important advantages over rubber in being highly inert to chemical action. It is well known, however, that polymers of this type develop considerable tackiness on standing, and that they are particularly liable to decomposition on exposure to radiation containing ultraviolet light. This property would tend to cause trouble in cases where layers of the polymer are permitted to lie in contact for a considerable length of time. It is an object of this invention to improve the surfaces of such polymers by chemical treatment, whereby the surface is made harder, less tacky, and notably less liable to decomposition and change on standing and exposure to light.

The objects of the invention are accomplished by exposing the surface of the polymerized olefin to the action of a halogen, whereby the latter combines with the surface layer and produces a hard, smooth surface, the methods of treatment being more fully set forth hereinafter. Of the four halogens, chlorine and fluorine are preferred, owing to the fact that rather strenuous conditions as to light, time of exposure, etc. are required to effect the reaction of bromine or iodine with the polymer surface.

The class of hydrocarbon polymers which are particularly suitable for treatment by the method of the present invention are the solid substantially saturated long linear polymeric hydrocarbons, e. g., polymerized isobutylene, polymerized isoamylene, polymerized ethylene, hydro-rubber, etc. Polymerized isobutylene may, for example, be produced by the polymerization of isobutylene alone or admixed with inert diluents at low temperatures, e. g., below —10° C. or —50° C. or even as low as —100° C. in the presence of a volatile inorganic halide catalyst, such as boron fluoride. Polymerized isobutylene having a molecular weight of 30,000 or above is, for example, sufficiently solid and rubber-like to permit its being used in many instances as a substitute for rubber and is therefore particularly adapted to treatment by the methods of the present invention. It is resistant to oxidation as well as to the action, under ordinary conditions, of sulfuric acid, nitric acid and caustic alkalis.

The hydrocarbon polymers described above are useful in general as substitutes for rubber, but are particularly useful in the water-proofing of fabrics and textiles, such, for example, as coats and bathroom curtains. They are also useful for coating the inner surfaces of tubes and pipes. If desired, pigments, such as iron oxide or carbon black, may be incorporated in the polymer to render it harder and tougher.

The treatment of the hydrocarbon polymers, according to the present invention, to improve the exposed surfaces thereof consists in treating the surface with a halogen in some form, preferably in the presence of light or ultra-violet rays or in the presence of halogenation catalysts. The halogenation may be accomplished without the aid of light or catalysts, however, using higher temperatures or simply longer exposure at ordinary temperatures. The halogen, e. g., chlorine, may be in the gaseous form, in which case the film or sheet of polymer is simply exposed to an atmosphere of the halogen, preferably in the presence of light. The halogen may also be introduced in the form of a solution, in which case a solvent is used which will not attack the surface of the polymer. Ethylene dichloride and ethyl chloride are examples of suitable solvents. If chlorine is used, it may, furthermore, be introduced in the form of liquid chlorine. In this case, the polymer is dipped into the liquid chlorine and quickly removed, in order to prevent undue action of the liquid chlorine below the surface of the polymer. The polymer, containing a film of the liquid chlorine upon its surface, is exposed to the action of light, and in this case the chlorination process extends somewhat below the surface and causes the formation of bubbles in the polymer mass, due to the evolution of hydrogen chloride. After the chlorination process is completed to the desired extent, the bubbles may be removed and the surface rendered smooth and continuous by subjecting the surface to a pressing operation. In the cases where the halogen is introduced in the form of a gas or a solution in an inert solvent, the halogenation takes place at the surface only and there is no appreciable bubble formation, although the surface may lose its transparency to some extent. In any case, the halogenation is preferably conducted in such a manner that the halogenation does not take place to a depth greater than about 0.01 inch. By the treatment with a halogen in any form, the surface of the polymer becomes notably harder and less tacky, and the mass of the polymer becomes less liable to change and decomposition on exposure to sunlight or ultra-violet light. Where chlorine is the halogen employed, it is desirable to form a surface layer containing not more than 50% by weight of chlorine and preferably between 20% and 40%.

Where the polymer under treatment consists of a thin film attached to a fabric, the treatment with a halogen should be conducted in such a manner that the fabric itself is not exposed to attack by the halogen. For example, the polymer-coated fabric may be exposed for a few minutes to a gas containing a fairly small percentage (about 10%) of chlorine in the presence of strong ultra-violet light, and the surface of the polymer will be improved by the chlorination without danger that the fabric itself will be affected in the short time of exposure.

Although ordinary atmospheric pressure and temperatures are used for the processes, somewhat higher pressures and higher temperatures (up to about 100° C.) may be used to advantage. Somewhat higher temperatures, in all cases below a temperature causing decomposition of the polymer, may be used with the less reactive halogens.

The methods of the present invention may be illustrated by the following examples.

Example I

A sheet of polymerized isobutylene of 50,000 to 60,000 molecular weight, produced by the polymerization of isobutylene in the presence of boron fluoride at a temperature of about −78° C. was exposed, at a distance of about six inches, to the rays from a Uviarc mercury vapor quartz lamp (Type H-1, 400 watt) in an atmosphere of pure chlorine for one hour on each side. It was observed that the polymer did not become degraded as it would have done in air exposed to ultra-violet light, that the slight tackiness of the surface of the polymer gradually disappeared, and that the sheet became considerably more opaque although no definite bubbles appeared on the surface. The flame test showed the presence of chlorine on the surface of the sheet.

Example II

A thin sheet of isobutylene polymer of about 100,000 molecular weight, produced by the polymerization of isobutylene in the presence of boron fluoride at about −78° C., was hung in a vessel filled with gaseous chlorine at atmospheric pressure for 12 hours in bright sunlight. The sheet after exposure exhibited a hard smooth surface. This sheet and another sheet which had not been treated with chlorine were exposed to ultra-violet light under similar conditions for 6 hours. It was observed that the sheet which had been treated with chlorine was noticeably less tacky than the untreated sheet.

The invention is not to be limited to any specific examples which are presented here for the purpose of illustration, but is to be limited only by the appended claims, in which it is intended to claim all novelty inherent in the invention as broadly as the prior art permits.

I claim:

1. An article composed of polymerized isobutylene characterized by a molecular weight above 30,000, having a surface coating thereon of chlorinated poly-isobutylene characterized by a hardened, non-sticky surface, a percentage content within the range of 20% to 50% by weight of chlorine and a substantial thickness of less than about $1/100$ inch.

2. The process of protecting an article composed of poly-isobutylene having a molecular weight above 30,000, comprising the step of treating the polymer surface with gaseous chlorine and light energy for a time interval to cause reaction of the chlorine with the polymer through a surface thickness of approximately $1/100$ inch and until a percentage content within the range of 20% to 50% of chlorine is obtained.

HAROLD W. FISHER.